2 Sheets—Sheet 1.
H. H. HERRICK.
Carpet Sweeper.
No. 1,079.
Reissued Nov. 20, 1860.
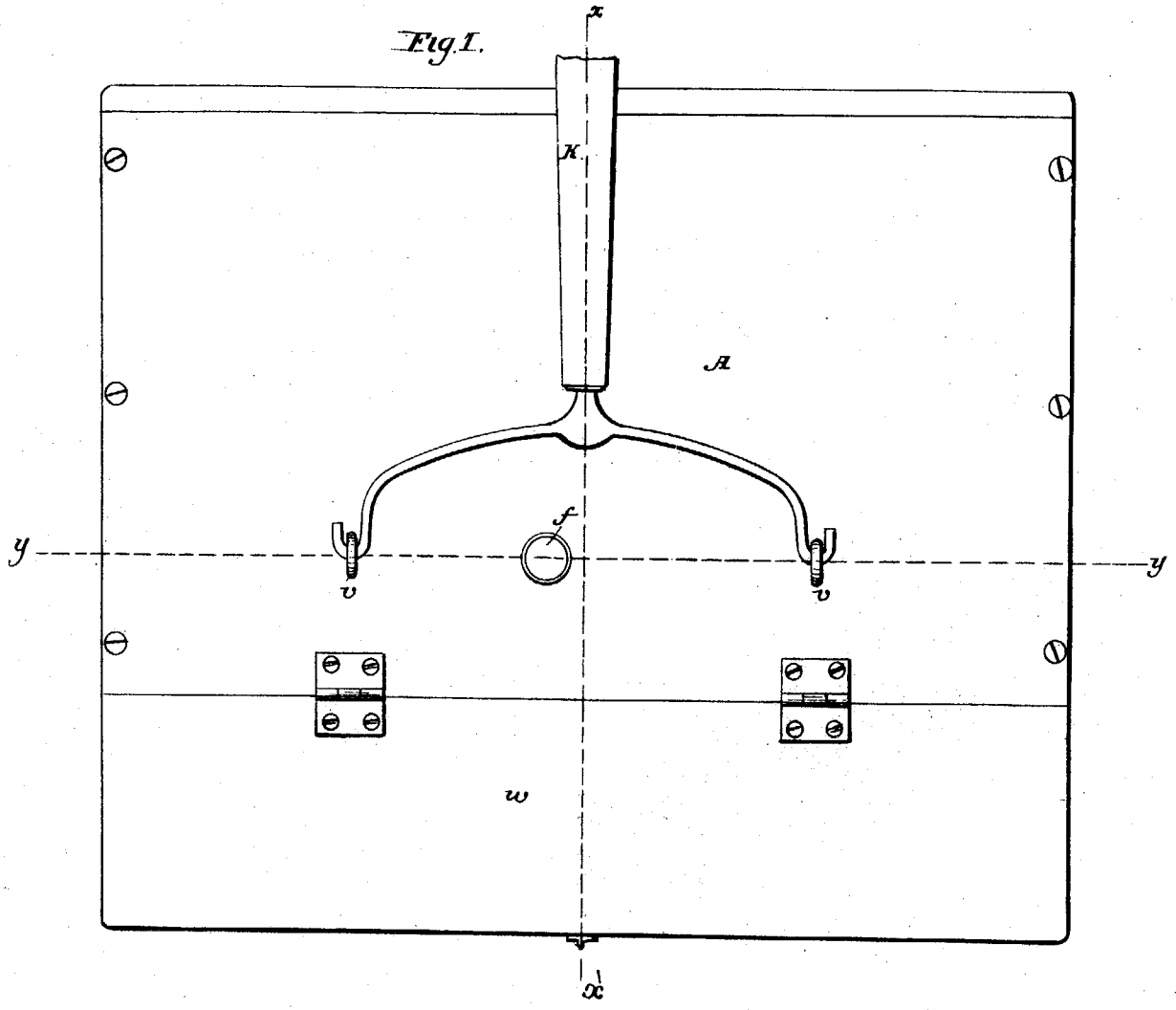

2 Sheets—Sheet 2.
H. H. HERRICK.
Carpet Sweeper.
No. 1,079.
Reissued Nov. 20, 1860.
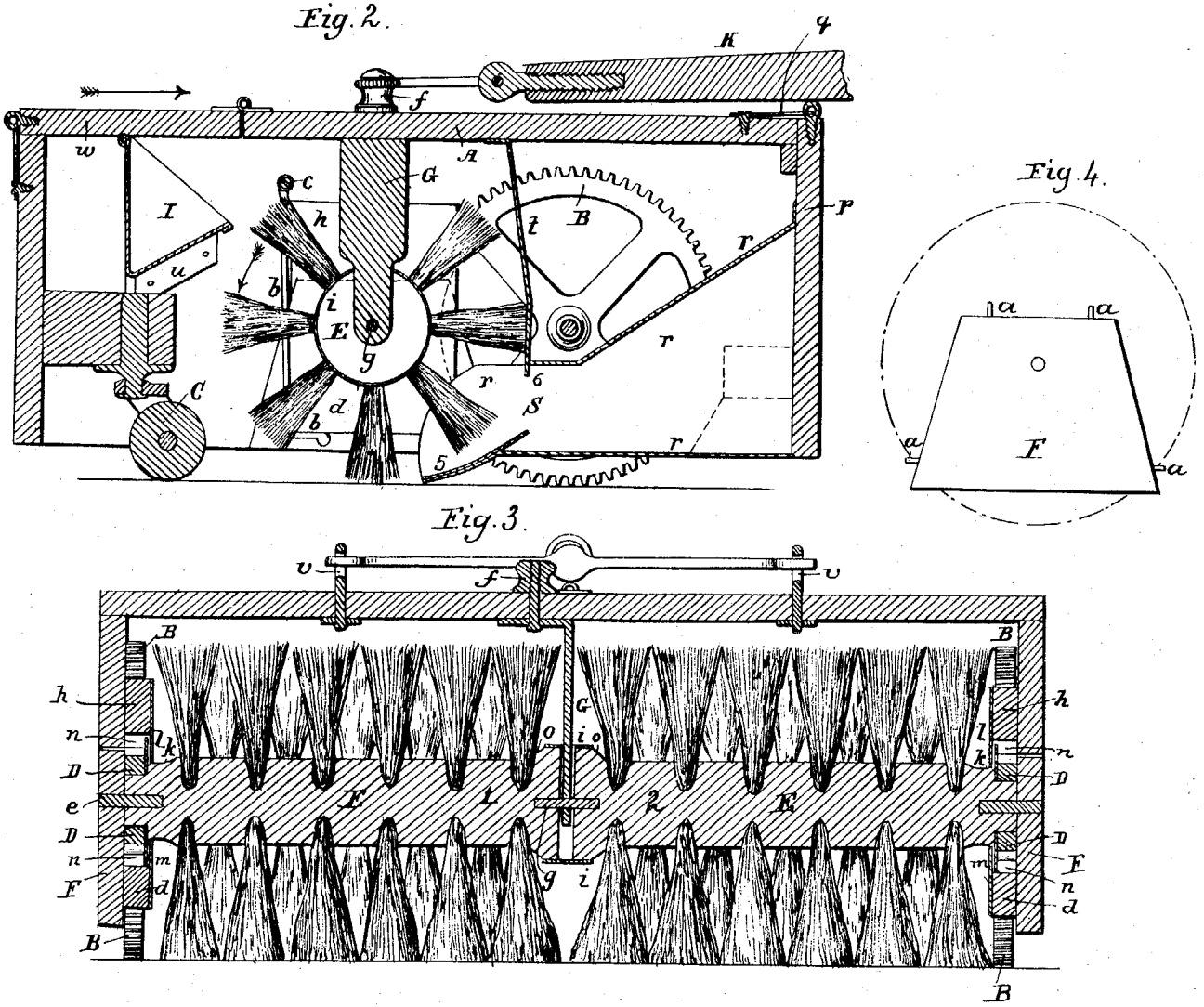

UNITED STATES PATENT OFFICE.

HIRAM H. HERRICK, OF BOSTON, MASSACHUSETTS, ASSIGNOR, BY MESNE ASSIGNMENTS, TO C. J. F. EASTMAN.

IMPROVED CARPET-SWEEPER.

Specification forming part of Letters Patent No. 21,233, dated August 17, 1858; Reissue No. 1,079, dated November 20, 1860.

*To all whom it may concern:*

Be it known that I, HIRAM H. HERRICK, of East Boston, in the county of Suffolk and State of Massachusetts, have invented a new and Improved Machine for Sweeping Carpets, of which the following is a full, clear, and exact description, reference being had to the accompanying drawings, making part of this specification, in which—

Figure 1 is a plan. Fig. 2 is a vertical section on the line *x x* of Fig. 1. Fig. 3 is a vertical section on the line *y y* of Fig. 1; Fig. 4, a detail to be referred to hereinafter.

My invention has reference to certain improvements in machines for sweeping floors and carpets, in which the rotation of the brush is effected by the movement of the box which contains it across the floor. The chief difficulties encountered in the construction of these machines arise from the accumulation of dust and the wrapping of threads round the journals.

To overcome these and other difficulties is the object of my present invention, which consists, first, in grooving or sloping the brush-shaft near its ends, as hereinafter described, whereby any threads which may be caught by it are guided away from the end bearings, and are wound up on the body of the shaft; second, in protecting the bearings from the dust by means of a peculiar arrangement of plates, as will be hereinafter described; and my invention also consists in a peculiar construction of dust-pan, hereinafter described, having a projecting edge or lip near the brush, and in having another pan or receptacle for dust, as hereinafter described, to catch the dust and dirt which may not be caught in the first pan. When the brush is very short, it may be connected at one end with one of the driving-wheels. When it is larger, however, more power is required to operate it than can thus be obtained; and if for this purpose the driving-wheels be both connected with the brush-shaft the machine will not operate well, as it cannot turn without dragging one of the wheels upon the carpet and injuring it. To remedy these difficulties, where a brush more than twelve or thirteen inches long is needed, I have divided the brush-shaft in the center, and connected the outer end of each portion with one of the driving-wheels, and in order that the continuity of the brush may not be interrupted the inner ends of the semi brush shafts are hung in a suspended bearing, as will now be more fully set forth and described.

In the drawings, A is a box, left open at the bottom. It is supported and runs on two cogged wheels, B, one on each side, and on a swiveling caster, C, at the rear end of it. The wheels B engage with cogged wheels D on the outer ends of the brush shaft E, and revolve it in the direction of its arrow, Fig. 2. This shaft is divided in the middle of its length into two portions, 1 and 2, for the convenience of turning the machine while in operation. It is supported in the following manner: A removable block, F, (detached in Fig. 4,) fits in each side of the box A. It is held in place by pins *a*, which enter corresponding grooves in the edge of the box, and by a hook, *b*, Fig. 2, which is pivoted at *c* to the inside of the box A, and hooks over a part, *d*, of the piece F, which projects in toward the brush. (See Fig. 3.) A journal, *e*, passes through each of the pieces F into the end of the shaft E. A metal piece, G, is suspended from the top of the box by a screw and nut, *f*. A pin, *g*, passes through this piece and enters the inner end of each of the parts 1 and 2 of the shaft E, and serves as journals for them. The removable block F, though useful and convenient, may be entirely dispensed with, the only effect of which is to make it more difficult to get at the cylinder in order to clean the ends. A band, *i*, of sheet metal encircles the ends of the parts 1 and 2, where they come together, a slot being cut in it for the piece G to pass through. This serves to keep the dirt from the journals *g*.

To protect the bearings at *e*, as well as the cogged wheel D, I have the following arrangement: The block *d*, projecting in from the piece F, and a corresponding block, *h*, secured to the side of the box A, embrace the cogged wheel D for the greater part of its circumference, leaving only so much of it exposed as is necessary to engage with the wheel B. A piece of sheet metal, *l*, is attached to the inner face of the block *h*, and a similar piece, *m*, to the block *d*. These pieces surround and come close to the shaft E, while an annular metal plate, *n*, attached to the shaft alongside the wheel D, revolves inside the plates *l* and *m*, leaving but a small space for dust to enter.

To prevent threads and similar things which may be apt to wind round the shaft E from entangling in the gears or journals, I have formed a groove, *k*, around the shaft, near each of its outer ends, and have also enlarged the ends of 1 and 2, so as to form an inclined surface at *o*. These inclines guide anything of this nature down upon the smaller part of the shaft and away from the bearings.

When the brush is so short as not to exceed twelve or thirteen inches in length, one driving-wheel and one undivided cylindrical brush is sufficient, in which case the journal of the cylinder at the end opposite the driving-wheel runs in a hole in the side of the box. This journal may be protected from threads and dust in the same way as that at the opposite end. In case there is but one driving-wheel, there should be a smooth iron wheel attached to the side of the box opposite the driving-wheel for the machine to run on.

The receptacles into which the dirt is swept will now be described. The front end, *p*, of the box A is made detachable, and is secured to the top by a hook and staple at *q*. To the outside of the end *p*, and removable with it, is attached a sheet-metal box, *r*. This box has a lip at 5, which is better for being a spring-lip, but it may be made tight. The edge of this lip comes in contact with the carpet or floor, and is about a quarter of an inch from the periphery of the brush, and should run nearly parallel to the outer edge of the brush, keeping about the same distance from it, for about three-quarters of an inch. The dirt is driven by the revolving brush up the inclined surface of the lip 5, and enters the box *r* through the throat *s*. A screen, *t*, which extends across the machine, is attached to the top of the box A, and hangs down from it, the lower edge resting against the box *r* or over the throat *s*. The lower edge of this piece, at 6, serves as a doctor or clearer for the brush, while any lighter particles of dust which may not enter the throat *s* are prevented from depositing on the top of the box *r*, and are carried round by the brush, to be received in trough I, near the rear end of the machine. This trough I rests on cleats *u*, attached to the sides of the box A, and may be removed by opening a shutter, *w*, in the top of the box. The screen, though useful, is not an indispensable part of the sweeper. A suitable handle, K, for pushing the box over the floor, is hinged to staples *v*, secured in the top of the box.

The manner of operating this machine is as follows: The wheels B and C rest on the surface to be swept. The box A is then pushed by the handle K in the direction of the arrow, Fig. 2. This causes the brush-shaft E to be revolved rapidly in the direction of its arrow, when the brushes sweep up the dirt over the lip 5 and deposit it in the removable box *r*, while any lighter dust which is thrown over by the brushes is caught in the trough I. After the sweeping is finished the trough I and the box *r* may be removed and be emptied.

If, after considerable use, it is found that the brushes or the shaft E have become clogged, they may be removed for cleaning by simply loosening the nut *f* on the top of the box A and drawing back the hooks *b*, when the pieces F and shaft E may be taken out.

What I claim as my invention, and desire to secure by Letters Patent, is—

1. Inclining or grooving the brush-shaft, as at *o* and *k*, as described, for the purposes specified, in combination with the cylinder-brush for sweeping, as before described.

2. Protecting the bearings from dust by means of the plates *l*, *m*, and *n*, operating in the manner described, for the purpose specified.

3. Two receptacles for receiving dust, the trough I, and the principal dust-pan, with the projecting lip, all arranged as and for the purposes specified, in combination with the cylindrical dust-brush.

4. Dividing the brush in the center and connecting each half with one of the driving-wheels, as set forth, in combination with the method herein described of pivoting the inner ends to a suspended support, as described, whereby the continuity of the brush is not interrupted, as set forth.

HIRAM H. HERRICK.

Witnesses:
S. E. SEWALL,
C. A. HATHAWAY.